US007887767B2

(12) United States Patent
Baron et al.

(10) Patent No.: US 7,887,767 B2
(45) Date of Patent: Feb. 15, 2011

(54) PROCESS FOR REPROCESSING A SPENT NUCLEAR FUEL AND OF PREPARING A MIXED URANIUM-PLUTONIUM OXIDE

(75) Inventors: Pascal Baron, Bagnols-sur-Ceze (FR); Binh Dinh, Pont Saint Esprit (FR); Michel Masson, Avignon (FR); Francois Drain, Saint Nom la Breteche (FR); Jean-Luc Emin, Montigny le Bretonneux (FR)

(73) Assignees: Commissariat a l'Energie Atomique, Paris (FR); Compagnie Generale des Matieres Nucleaires, Velizy Villacoublay (FR)

( * ) Notice: Subject to any disclaimer, the term of this patent is extended or adjusted under 35 U.S.C. 154(b) by 795 days.

(21) Appl. No.: 11/753,182

(22) Filed: May 24, 2007

(65) Prior Publication Data

US 2007/0290178 A1 Dec. 20, 2007

Related U.S. Application Data

(60) Provisional application No. 60/853,024, filed on Oct. 20, 2006.

(30) Foreign Application Priority Data

May 24, 2006 (FR) .................................. 06 04717

(51) Int. Cl.
*G21C 19/00* (2006.01)
(52) U.S. Cl. .................... 423/8; 423/9; 423/10; 423/20; 423/250; 423/251; 423/260; 376/310
(58) Field of Classification Search ................ 423/8–10, 423/20, 250, 251, 260; 976/DIG. 277; 376/310
See application file for complete search history.

(56) References Cited

U.S. PATENT DOCUMENTS

| 4,278,559 | A  | * | 7/1981  | Levenson et al. ........... 252/636 |
| 7,169,370 | B2 | * | 1/2007  | Mesmin et al. ................. 423/3 |
| 2005/0288542 | A1 | * | 12/2005 | Grandjean et al. .......... 588/313 |

FOREIGN PATENT DOCUMENTS

| EP | 0270453 | * | 6/1988 |
| FR | 2870841 | * | 12/2005 |
| GB | 1206775 | * | 9/1970 |
| GB | 2004407 | * | 3/1979 |

OTHER PUBLICATIONS

U.S. Appl. No. 12/300,705, filed Nov. 13, 2008, Baron et al.
P. Baron, et al.; "Plutonium Purification Cycle in Centrifugal Extractors: comparitive study of flowsheets using uranous nitrate and hydroxylamine nitrate"; Proceedings of RECOD'98—Nice (France); Oct. 25-28, 1998; vol. 1; pp. 401-408.
Claude Bernard, et al.; "Advanced Purex Process for The New French Reprocessing Plants"; Proceedings of GLOBAL'93—Washington (USA); 1993; pp. 57-62.
P. Baron, et al.; "Progress in Partitioning: Activities in ATALANTE"; OECD Nuclear Energy Agency; 9th Information Exchange Meeting on Actinide and Fission Partitioning and Transmutation—Nîmes (France); Sep. 25-29, 2006; pp. 1-27.
François Drain, et al.; "Uranium/Plutonium Separation in Annular Pulsed Column"; Proceedings of Global'97—Yokohama (Japan; Oct. 5-10, 1997 pp. 250-254.
E. D. Collins, et al.; "Development of the UREX+ co-decontamination solvent extraction process"; Proceedings of Global'2003—New Orleans (USA); Nov. 16-20, 2003 pp. 1-2.
M. Montuir, et al.; "Simplified nuclear fuel reprocessing flowsheet: a single-cycle PUREX process"; Proceedings of Atalante 2004; Advances for nuclear fuel cycles; Nînes (France); Jun. 21-24, 2004; pp. 1.
B. Dinh, et al.; "Dynamic Simulation of Extraction Operations, Applications in Nuclear Fuel Reprocessing"; Proceedings of ESCAPE 2: European Symposium on computer Aided Process Engineering—Toulouse (France); Oct. 5-7, 1992; pp. 45-50.

* cited by examiner

*Primary Examiner*—Steven Bos
(74) *Attorney, Agent, or Firm*—Oblon, Spivak, McClelland, Maier & Neustadt, L.L.P.

(57) ABSTRACT

The invention relates to a process for reprocessing a spent nuclear fuel and for preparing a mixed uranium-plutonium oxide, which process comprises:
  a) the separation of the uranium and plutonium from the fission products, the americium and the curium that are present in an aqueous nitric solution resulting from the dissolution of the fuel in nitric acid, this step including at least one operation of coextracting the uranium and plutonium from said solution by a solvent phase;
  b) the partition of the coextracted uranium and plutonium to a first aqueous phase containing plutonium and uranium, and a second aqueous phase containing uranium but no plutonium;
  c) the purification of the plutonium and uranium that are present in the first aqueous phase; and
  d) a step of coconverting the plutonium and uranium to a mixed uranium/plutonium oxide.

Applications: reprocessing of nuclear fuels based on uranium oxide or on mixed uranium-plutonium oxide.

46 Claims, 5 Drawing Sheets

PROCESS FOR REPROCESSING A SPENT NUCLEAR FUEL AND OF PREPARING A MIXED URANIUM-PLUTONIUM OXIDE

TECHNICAL FIELD

The present invention relates to a novel process for reprocessing a spent nuclear fuel, based on uranium oxide or on mixed uranium-plutonium oxide, which makes it possible for the uranium and plutonium to be very effectively decontaminated from other chemical elements contained in this fuel without leaving, at any moment during this process, plutonium without uranium, so as to minimize the risk of misappropriating the plutonium for military purposes.

The process of the invention also makes it possible to obtain, at the end of this decontamination, a mixed uranium-plutonium oxide powder that can be used directly in processes for manufacturing MOX (Mixed OXide Fuel) nuclear fuels, such as the MIMAS (MIcronized MASter Blend) process.

PRIOR ART

At the present time, all plants for reprocessing spent nuclear fuels use the PUREX (Plutonium Uranium Refining by EXtraction) process for recovering the uranium and plutonium that are present in these fuels.

This is obtained by carrying out several purification cycles using the liquid-liquid extraction technique (that is to say by mixing an aqueous phase and a solvent phase that are mutually immiscible, followed by separation of these two phases by settling) which is carried out in multistaged units of the mixer/settler type, pulsed columns or centrifuge extractors, which are connected in series so as to allow these cycles and the various operations that they comprise to be carried out continuously.

The PUREX process, as implemented in modern reprocessing plants such as UP3 and UP2-800 plants on the Areva NC site at La Hague in France, or Rokkasho plant in Japan, schematically comprises three purification cycles: a first cycle, the purpose of which is essentially to decontaminate both the uranium and the plutonium from the fission products and from two minor actinides, namely americium and curium, and also to partition these two elements into two separate streams; and two complementary cycles called the "second plutonium cycle" and "second uranium cycle", respectively, the purpose of which is to purify the plutonium and the uranium after their partition.

The first cycle starts with an operation which consists in extracting both the uranium and the plutonium, the first being in oxidation state (VI), and the second being in oxidation state (IV), from the aqueous phase in which they are found.

This aqueous phase is obtained by dissolving a spent fuel in nitric acid and clarifying the mixture thus obtained. This phase is commonly called the "dissolution liquor".

The coextraction of the uranium and plutonium is carried out by means of a water-immiscible solvent phase that contains an extractant having a high affinity for uranium(VI) and for plutonium(IV), in this case tri-n-butyl phosphate (or TBP) used with a concentration of 30% (v/v) in an organic diluent, in this case a dodecane. The uranium and the plutonium thus pass into the solvent phase, while most of the fission products, americium and curium remain in the aqueous phase.

It is followed by one or more scrubbing operations in which the solvent phase is scrubbed by one or more aqueous nitric phases of different acidities, so as to remove the fission products from said solvent phase that were extracted with the uranium and the plutonium.

The aqueous phase or phases resulting from these coextraction and scrubbing operations (or raffinates), which are laden with fission products, are removed from the cycle whereas the solvent phase, which is itself laden with uranium (VI) and with plutonium(IV), is directed to a zone in which the partition of these two elements is carried out.

This partition comprises:

an operation for the purpose of back-extracting the plutonium from the solvent phase by means of an aqueous nitric phase of low acidity, containing a reducing agent capable of reducing plutonium(IV), which is highly extractable by TBP, to plutonium(III) which is itself only barely extractable, and to do so without reducing the uranium, and also a nitrous acid scavenger, the role of which is to stabilize both the uranous nitrate and the plutonium(III) by destroying the nitrous acid that tends to form in the aqueous nitric phase; in this case the reducing agent is uranous nitrate, while the nitrous acid scavenger is hydrazinium nitrate, also called hydrazine.

an operation whose purpose is to complete the back-extraction of plutonium from the solvent phase by means of an aqueous nitric phase, also of low acidity and containing uranous nitrate and hydrazine; and an operation whose purpose is to back-extract the uranium (VI) from said solvent phase by means of a very dilute aqueous nitric solution.

Since the back-extraction of the plutonium from the solvent phase is accompanied by partial back-extraction of the uranium, the partition further includes a step whose purpose is to remove the uranium from the aqueous nitric phase resulting from the operation of back-extracting the plutonium by means of a solvent phase, of the same composition as that used for coextracting the uranium and plutonium.

Thus, what are obtained after the first cycle are:

a first aqueous stream that contains more than 99% of the plutonium initially present in the dissolution liquor and no longer contains any uranium; and a second aqueous stream that contains more than 99% of the uranium initially present in the dissolution liquor and no longer contains any plutonium.

The first aqueous stream resulting from the first cycle is then subjected to the "second plutonium cycle", the purpose of which is to complete the decontamination of the plutonium from the fission products liable to be still present in trace amounts in this stream. Thereafter, this stream which contains plutonium at a purity level of greater than 99.9%, is directed to a zone where the plutonium is converted into the oxide ($PuO_2$) and then stored in this form, for the purpose of its subsequent use in the manufacture of MOX nuclear fuel pellets.

In parallel, the second aqueous stream resulting from the first cycle is subjected to the "second uranium cycle", the purpose of which is to complete the decontamination of the uranium from the fission products, but especially to separate it from the neptunium.

This is because, in the first cycle, most of the neptunium present in the dissolution liquor is extracted, mainly in the form of neptunium(VI) at the same time as the uranium and the plutonium. During the reducing back-extraction of the plutonium in the first cycle, the neptunium(VI) is reduced by uranous nitrate to neptunium(IV), in which state it can be extracted by TBP, although less than in oxidation state (VI).

The neptunium therefore almost quantitatively follows the uranium during all the operations of the first cycle, hence the need to subject the aqueous uranium-laden stream, resulting from the partition, to a complementary cycle suitable for stripping it of the neptunium before it is converted to uranium oxide.

Like the plutonium resulting from the "second plutonium cycle", the uranium has, after the "second uranium cycle", a purity level of greater than 99.9%. It is also converted to the oxide and stored in this form.

Moreover, a method has been proposed in U.S. Pat. No. 4,278,559 for recycling spent nuclear fuels with the aim of limiting, in all the stages of this recycling, the risk of plutonium being diverted for military purposes.

This method is designed to obtain, after the step of coextracting, the uranium and plutonium in a solvent phase containing, apart from these elements, 0.1 to 10% of the fission products initially present in the dissolution liquor, then to obtain, during the partition step, a plutonium production stream diluted with uranium and containing most of the radioactive fission products present in said solvent phase. This plutonium production stream is then processed by a sol-gel method in order to obtain plutonium-uranium-fission products mixed oxide, which are subsequently used to manufacture fresh nuclear fuels.

Although the presence of radioactive fission products in non-negligible quantities in fresh nuclear fuels is not an obstacle to the use of these fuels in fast neutron reactors, this is not the case as regards their use in the current light-water reactors. This is because such a use would make it necessary to develop a new type of fuel having a substantially increased content of fissile material because of the neutron-absorbing character of certain fission products and to carry out lengthy and expensive studies in order to obtain homologation of this fuel.

Moreover, the presence of radioactive fission products at all stages in the spent fuel reprocessing and fresh fuel production chains, as provided in the method described in US-A-4 278 559, means having installations provided with radiation protection systems suitable for processing radioactive streams, and this being the case for each of the plants involved in this chain. Implementation of this method on an industrial scale would therefore necessarily involve either substantial reinforcement of the radiological protection with which existing nuclear fuel reprocessing and production installations are provided, or the production of new installations especially designed for operating a highly radioactive processing chain, which in both cases would result in a very considerable overcost.

With a view to developing new plants for reprocessing spent nuclear fuel, the inventors were set the objective of providing a process which, like the PUREX process previously described, allows uranium and plutonium to be effectively decontaminated from the other chemical elements present in a spent nuclear fuel, and in particular from the fission products, but which, unlike the PUREX process, at no time leaves plutonium by itself, whether in the solid or liquid state.

The inventors were also set the objective that this process should make it possible to obtain a mixed uranium-plutonium oxide that can be directly used for the manufacture of MOX nuclear fuels, whatever the purpose of these fuels: namely fast neutron reactors or light-water reactors.

They were furthermore set the objective that this process should use, at least in part, the knowledge and know-how acquired in the PUREX process, in terms of both procedures and installations, so that it can be industrially exploited in the short or medium term.

SUMMARY OF THE INVENTION

These objectives, and yet others, are achieved by a process for reprocessing a spent nuclear fuel and of preparing a mixed uranium-plutonium oxide, which comprises at least:

a) a step of separating the uranium and plutonium from the fission products, the americium and the curium that are present in an aqueous nitric solution that results from dissolving the spent nuclear fuel in nitric acid, this step comprising at least one operation of coextracting uranium, in oxidation state (VI), and plutonium, in oxidation state (IV), from said aqueous solution by bringing this solution into contact with a water-immiscible solvent phase containing at least one extractant;

b) a step of partitioning the uranium and plutonium coextracted in step a) into two aqueous phases, namely a first aqueous phase containing plutonium and uranium, and a second aqueous phase containing uranium but not containing plutonium;

c) a step of purifying the plutonium and uranium present in the first aqueous phase obtained after step b) from the fission products also liable to be found in this phase; and d) a step of coconverting the plutonium and uranium that are present in the aqueous phase obtained after step c) into a mixed uranium-plutonium oxide.

Thus, unlike the PUREX process described above, which provides, once the uranium and the plutonium have been coextracted from the dissolution liquor, for the complete separation of these two elements from each other, and subsequently processes them independently of each other, the process of the invention itself proposes to only partially separate the plutonium from the uranium and to keep it, throughout all the consecutive steps of this separation, in the presence of uranium until a mixed uranium-plutonium oxide is obtained.

Preferably, step a) of the process of the invention includes, in addition to a coextraction operation, at least one scrubbing operation carried out on the solvent phase obtained after this coextraction in order to remove from this phase the fission products that were extracted together with the uranium(VI) and the plutonium(IV), this scrubbing operation being performed by bringing said solvent phase into contact with an aqueous nitric phase.

Also preferably, step b) of the process of the invention comprises at least:

$b_1$) a step of back-extracting the plutonium, in oxidation state (III), and a fraction of the uranium, in oxidation state (VI), which are present in the solvent phase obtained after step a), by bringing this phase into contact with an aqueous nitric phase containing a reducing agent capable of reducing plutonium(IV) to plutonium(III) without reducing the uranium, for example uranous nitrate (uranium(IV) nitrate) or hydroxylammonium nitrate; and $b_2$) an operation of back-extracting the uranium that has not been back-extracted from the solvent phase during operation $b_1$), by bringing this phase into contact with an aqueous nitric phase.

Two aqueous phases are thus obtained, one of which contains plutonium and uranium, while the other contains uranium but does not contain plutonium.

Step c) of the process of the invention then preferably comprises, at least:

c₁) an operation of coextracting the plutonium, in oxidation state (IV), and the uranium, in oxidation state (VI), from the aqueous phase obtained after step b₁), by bringing this phase into contact with a water-immiscible solvent phase containing at least one extractant in an organic diluent;

c₂) a scrubbing operation in which the solvent phase obtained after operation c₁) is scrubbed in order to remove the fission products from this phase that were extracted together with the plutonium(IV) and the uranium(VI) during operation c₁), this scrubbing operation being performed by bringing this phase into contact with an aqueous nitric phase; and c₃) an operation of back-extracting the plutonium, in oxidation state (III), and a fraction of the uranium, in oxidation state (VI), from the solvent phase obtained after operation c₂), by bringing this phase into contact with an aqueous nitric phase containing a reducing agent capable of reducing the plutonium(IV) to plutonium(III) without reducing the uranium, for example uranous nitrate or hydroxylammonium nitrate.

It goes without saying that, if steps b) and c) are carried out in the manner that has just been described, then the process of the invention further includes, between these steps, an oxidation operation in order to reoxidize the plutonium(III) present in the aqueous phase obtained after operation b₁) to plutonium(IV). This oxidation operation also allows the uranium(IV) also liable to be present in this phase to be reoxidized to uranium(VI) especially if the reducing agent used during operation b₁) is uranous nitrate.

Moreover, if step b) is carried out in the manner as just described, the aqueous phase obtained after operation b₁) inevitably contains neptunium.

It is therefore necessary to remove the latter if it is desired to obtain, at step d), a mixed uranium-plutonium oxide containing no neptunium.

Therefore, in one embodiment mode of the process according to the invention it includes the removal of the neptunium present in the aqueous phase obtained after operation b₁), either during step b) or during step c).

This removal of the neptunium may, firstly, be carried out by adding to step b) an operation b₃) of re-extracting the neptunium, in oxidation state (IV), from the aqueous phase obtained after operation b₁), by bringing this phase into contact with a water-immiscible solvent phase containing at least one extractant in an organic diluent.

Since uranium(VI) and neptunium(IV) behave in a relatively similar manner, a fraction of the uranium(VI) present in the aqueous phase obtained after operation b₁) is back-extracted with the neptunium. Therefore, the invention provides the possibility of adding the uranium either to the aqueous nitric phase subjected to operation b₃), or to the aqueous nitric phase subjected to operation c₃), or to both, if it is deemed necessary for these phases to be recharged with uranium.

In all cases, the uranium added may be uranium(VI) or uranium(IV).

The removal of the neptunium may also be carried out during operation c₂) by adding, to the aqueous phase used during this operation, a reducing agent capable of selectively reducing neptunium(VI) to neptunium(V) that is to say without reducing the plutonium or the uranium, and to do so in order to allow the neptunium to pass into the aqueous phase while leaving the plutonium and the uranium in the solvent phase.

As a variant of the above it is also possible not to remove the neptunium present in the aqueous phase obtained after operation b₁) but to let it follow the plutonium present in this phase as far as step d), so as to obtain a mixed uranium-plutonium-neptunium oxide. Therefore, depending on whether or not the neptunium present in the aqueous phase obtained after operation b₁) is removed, depending on the way in which this removal is carried out, depending on the type of reducing agent used during operation c₃) and depending on whether or not the uranium(IV) is added during this operation, there is obtained, after step c), an aqueous phase that contains plutonium(III), uranium(VI) and possibly also contains uranium(IV) and/or neptunium(IV) or (V).

However, in all cases, the aqueous phase obtained after step c) preferably does not contain more than one µCi of fission products per gram of plutonium so as to meet the NF ISO 13463 standard of June 2000 relating to the manufacture of MOX nuclear fuels for light-water reactors. Moreover, this aqueous phase advantageously has a U/Pu mass ratio ranging from about 20/80 to 50/50. Thus, the function of step c) is twofold: namely to purify the plutonium and uranium that are present in the first aqueous phase obtained after step b) with respect to the fission products, on the one hand, and to allow the uranium/plutonium mass ratio to be adjusted on the other hand.

Step d) itself is preferably carried out as described in French Patent Application No. 2 870 841, that is to say:

by stabilizing the plutonium, in oxidation state (III), the uranium, in oxidation state (IV), and, where appropriate, the neptunium, in oxidation state (IV), by a singly-charged cation consisting only of atoms chosen from oxygen, carbon, nitrogen and hydrogen atoms, such as the hydrazinium cation;

by coprecipitating the thus stabilized plutonium, uranium and, where appropriate, neptunium by oxalic acid or by one of its salts or of its derivatives; and then by calcining the resulting coprecipitate, preferably in an inert or very slightly oxidizing gas, for example a gas containing predominantly argon, in order to remove the carbon and prevent the formation of $U_3O_8$.

In accordance with the invention, the process advantageously also includes a storage step, which consists in storing either the aqueous phase obtained after operation c₃) before step d) is carried out, or the mixed uranium-plutonium oxide obtained after step d).

This storage step, which advantageously corresponds to several months of reprocessing spent nuclear fuels by the process of the invention, for example about 4 to 6 months, makes it possible, on the one hand, to ensure that the workshops responsible for reprocessing spent nuclear fuel are decoupled from those responsible for manufacturing fresh nuclear fuel from the mixed uranium-plutonium oxide obtained after this reprocessing, and on the other hand, to adjust the isotopy of the plutonium to that required by the workshops for manufacturing fresh nuclear fuel.

By means of the fact that plutonium, uranium and neptunium are more stable in solution in the oxidized state than in the reduced state, but that their coconversion to a mixed oxide requires them to be in the reduced state, the process of the invention provides, in the case of the aqueous phase obtained after step c₃) being stored, for this phase to be subjected:

between step c) and the storage step, to an oxidation operation in order to reoxidize the plutonium(III) and, where appropriate, the uranium(IV) and/or the neptunium(IV) or (V) to plutonium(IV), to uranium(VI) and to neptunium(VI), respectively, and then to a concentration operation in order to reduce the volume of material stored; and between the storage step and step d):

to a reduction operation, for example of the electrolytic type, in order to reduce the plutonium(IV), the uranium (VI), and, where appropriate, the neptunium(VI) to plutonium(III), to uranium(IV) and to neptunium(IV), respectively; or else to a reduction operation, for example by U(IV) or NHA, in which the plutonium(IV), and, where appropriate, the neptunium(VI), are reduced to plutonium(III) and neptunium(IV), respectively, in which case this reduction operation is supplemented with an operation of extracting the uranium(VI), by bringing said aqueous phase into contact with a water-immiscible immiscible solvent phase containing at least one extractant in an organic diluent.

In all cases, the process of the invention makes it possible to obtain a mixed uranium-plutonium oxide which, depending on whether or not the neptunium present in the aqueous phase after operation $b_1$) has been removed, contains no neptunium or, on the contrary, also contains neptunium.

In either case, this mixed oxide, which is in the form of a powder, can then be used directly for the manufacture of pellets of a mixed nuclear fuel.

For this manufacture, this mixed oxide preferably has a U/Pu mass ratio of around 50/50 when it does not contain neptunium and a U/Pu/Np mass ratio of around 49/49/2 when it does contain neptunium.

The parameters used during the various operations of the process of the invention such as the volume ratios of the solvent phases to the aqueous phases, the number and the duration of the contacting operations between these phases, the acidity of the aqueous phases, etc., and also the amounts of U(VI) or (IV) that can be added during operations $b_1$) and $c_3$), are therefore adjusted accordingly.

As a person skilled in the art will have understood on reading the foregoing text, the extractant for the solvent phases which is used in steps a) and c) and also during the uranium(VI) extraction operation prior to step d), is preferably chosen from extractants that complex the metallic species in oxidation states (IV) and (VI) more strongly than the metallic species in oxidation states (I), (II), (III) and (V), so that uranium(IV), uranium(VI), plutonium(IV), neptunium (IV) and neptunium(VI) are considerably more extractable than plutonium(III) and neptunium(V).

This extractant may in particular be a trialkyl phosphate, such as tri-n-butyl phosphate (or TBP), triisobutyl phosphate (TiBP) or a triisoamyl phosphate.

The organic diluent for this extractant may itself be chosen from various hydrocarbons proposed for liquid-liquid extractions, such as toluene, xylene, t-butylbenzene, triisopropylbenzene, kerosene and linear or branched dodecanes, such as n-dodecane or hydrogenated tetrapropylene (HPT).

However, it is preferred to use, as in the PUREX process, tri-n-butyl phosphate in a dodecane, and to do so in a volume ratio of around 30/70.

As mentioned above, the reducing agent capable of reducing plutonium(IV) to plutonium(III), which is used during operations $b_1$) and $c_3$), may especially be uranous nitrate or hydroxylammonium nitrate. Preferably either one is used in conjunction with a nitrous acid scavenger, preferably hydrazine.

As regards the reducing agent capable of reducing neptunium(VI) to neptunium(V) without reducing either the uranium or the plutonium, which is used during operation $c_2$) for removing the neptunium, this may especially be a compound of the family of butyraldehydes or hydrazine.

In one particularly preferred embodiment mode of the process of the invention, when the uranium and plutonium are coextracted in step a) by means of a solvent phase containing about 30% (v/v) tri-n-butyl phosphate in a dodecane, this step comprises:

a first scrubbing operation carried out on the solvent phase obtained after coextracting the uranium and plutonium, in order to remove most of the fission products, and in particular ruthenium and zirconium, which were extracted during this coextraction, by bringing said solvent phase into contact with an aqueous nitric phase containing around 1 to 3 mol/L of $HNO_3$;

a second scrubbing operation carried out on the solvent phase in order to remove, from this phase, the technetium which was extracted during the coextraction operation, by bringing said solvent phase into contact with an aqueous nitric phase containing around 3 to 5 mol/L of $HNO_3$; and a complementary operation of coextracting uranium and plutonium from the aqueous phase obtained after the second scrubbing operation, by bringing this phase into contact with a solvent phase containing about 30% (v/v) tri-n-butyl phosphate in a dodecane.

Moreover, in this particular preferred embodiment mode:

the aqueous nitric phases used during operations $b_1$) and $c_3$) contain around 0.05 to 2 mol/L of $HNO_3$;

the aqueous nitric phase used during operation $b_2$) contains around 0 to 0.05 mol/L of $HNO_3$; whereas the aqueous nitric phase used during operation $c_2$) contains around 1 to 3 mol/L of $HNO_3$.

If necessary, the process of the invention may also include operations of purifying the uranium present in the second aqueous phase obtained after step b), in order to complete its decontamination from the fission products and/or to separate it from the neptunium liable to have followed it in the aqueous phase during operation $b_2$). These operations may be carried out as in any conventional PUREX process (see, for example, the article BN 3 650 (07-2000) of the treatise "Génie Nucléaire"—"Techniques de l'Ingénieur").

The process according to the invention has many advantages. While being just as effective as the PUREX process in terms of decontamination, unlike the latter, it never allows plutonium to be left without uranium, and thus it minimizes the risk of plutonium being misappropriated for military purposes. It also makes it possible to obtain a mixed uranium-plutonium oxide powder that can be used directly for the manufacture of MOX nuclear fuels for fast neutron reactors or light-water reactors of the second or third generation. Moreover, it is equally applicable to the reprocessing of a spent uranium oxide nuclear fuel as to the reprocessing of a spent mixed uranium-plutonium oxide nuclear fuel.

Other advantages and features of the process of the invention will become apparent upon reading the rest of the description that follows, which refers to examples of processes for the industrial-scale implementation of this process.

Of course, these examples are given merely to illustrate the invention and in no way constitute a limitation thereof.

In the embodiments modes shown in FIGS. 1 to 5, all the extraction, back-extraction and re-extraction operations are carried out in multi-staged units of the mixer/settler, pulsed column or centrifuge-extractor type. The directions of flow of the solvent phase entering or leaving these units are shown symbolically by a continuous double-line arrow, while the directions of flow of the aqueous phase entering or leaving the said units are shown symbolically by a continuous single-line arrow.

DETAILED DESCRIPTION OF EMBODIMENT MODES OF THE PROCESS ACCORDING TO THE INVENTION

Figure 1:
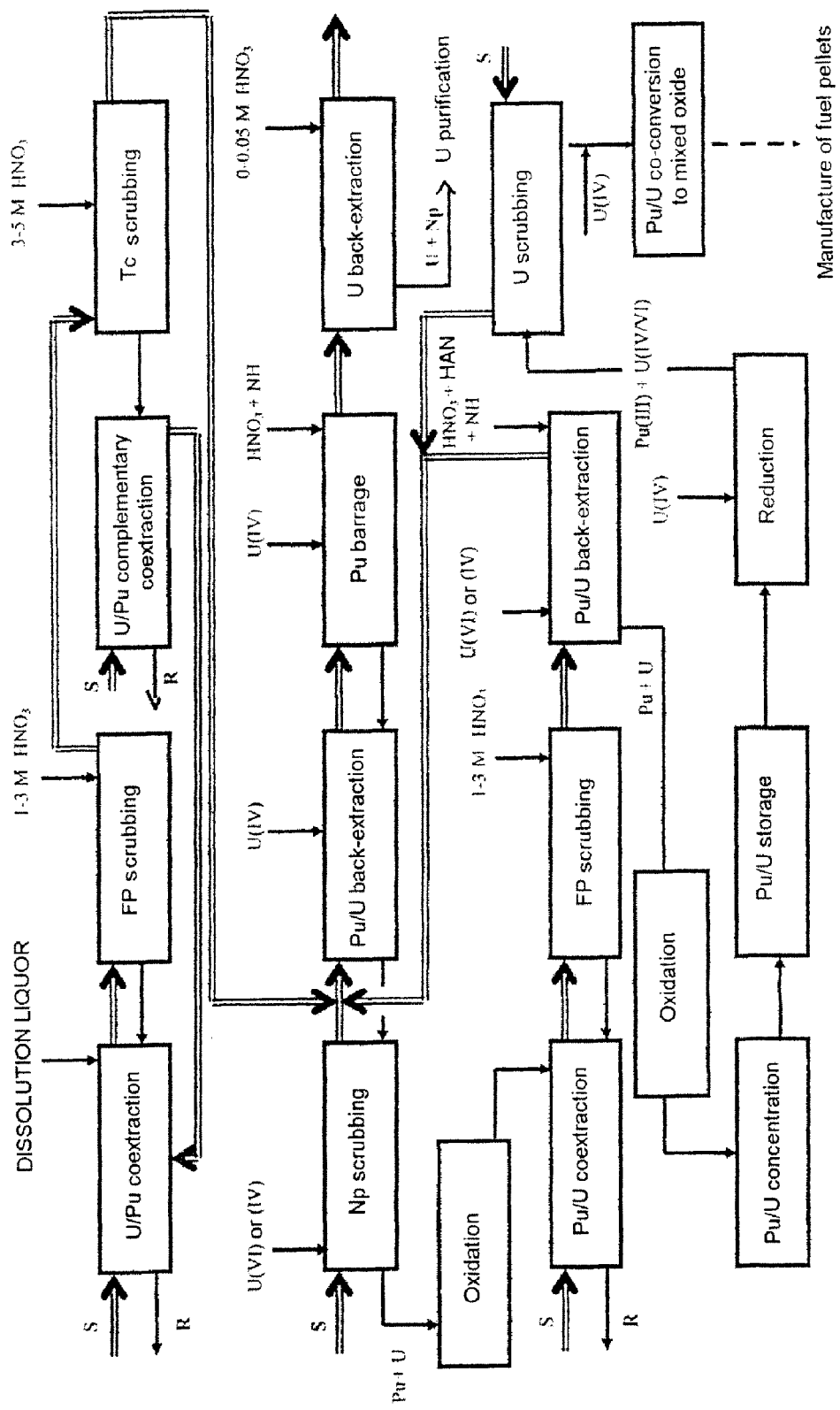
FIG. 1 shows a block diagram of a first embodiment mode of the process of the invention.

The description firstly refers to FIG. 1, which shows a block diagram of a first embodiment mode of the process of the invention, designed to obtain a mixed uranium-plutonium oxide powder containing no neptunium and able to be used directly in the manufacture of an MOX nuclear fuel, from a dissolution liquor of a spent $UO_2$ nuclear fuel that has been conventionally prepared, that is to say by dissolving this fuel in nitric acid and clarifying the resulting mixture.

Such a dissolution liquor typically contains 200 to 300 g/L of uranium per 2 to 3 g/L of plutonium, i.e. a U/Pu ratio of about 100/1, and has a content of fission products of around 50 to 70 Ci per gram of plutonium. As mentioned previously, the process of the invention firstly comprises a step designed to separate the uranium and the plutonium from the fission products, the americium and the curium.

As may be seen in FIG. 1, this separation step comprises:

an operation, labelled "U/Pu coextraction", which consists in extracting both the uranium and the plutonium, the first in oxidation state (VI), the second in oxidation state (IV), from the dissolution liquor by bringing this liquor into contact with a solvent phase containing about 30% (v/v) tri-n-butyl phosphate (TBP) in an organic diluent, for example, a dodecane;

an operation, labelled "FP scrubbing", which consists in removing from the solvent phase the fission products, particularly ruthenium and zirconium, that have been extracted during the "U/Pu coextraction" by bringing the solvent phase resulting from this coextraction into contact with an aqueous nitric phase of moderate acidity, for example a 1 to 3M nitric acid solution;

an operation, labelled "Tc scrubbing", which consists in removing from the solvent phase the technetium that has been extracted during the "U/Pu coextraction", by bringing the solvent phase resulting from the "FP scrubbing" into contact with an aqueous nitric phase of moderate acidity, but higher than that of the aqueous nitric phase used for the "FP scrubbing", for example a 3M to 5M nitric acid solution; and an operation, labelled "U/Pu complementary coextraction", which consists in recovering the U(VI) and Pu(IV) fractions that have followed the technetium in the aqueous phase during the "Tc scrubbing", by bringing this aqueous phase into contact with a solvent phase, again consisting of about 30% (v/v) TBP in a dodecane.

Four phases are thus obtained:

the two aqueous phases (or raffinates) resulting from the "U/Pu coextraction" and from the "U/Pu complementary coextraction", which are laden with fission products and, in the case of the first of said aqueous phases, with americium and with curium, and which are removed from the process;

the solvent phase resulting from the "U/Pu complementary coextraction" which is sent to the unit where the "U/Pu coextraction" takes place, to be added to the solvent phase flowing through this unit; and the solvent phase resulting from the "Tc scrubbing" which is laden with U(VI), with Pu(IV) but also with neptunium(VI) (since most of the neptunium present in the dissolution liquor is extracted by the TBP) and is sent to a zone where the uranium/plutonium partition step takes place, in which two aqueous phases are formed, the first containing plutonium and uranium, the second phase containing uranium but no plutonium.

This partition step comprises:

an operation, labelled "Pu/U back-extraction", which consists in back-extracting, from the solvent phase resulting from the "Tc scrubbing", the plutonium(IV) and a fraction of the uranium(VI) that are present in this phase, by bringing said solvent phase into contact with an aqueous phase of low acidity, for example a 0.05 to 2M nitric acid solution, containing a reducing agent that reduces the Pu(IV) to Pu(III) and neptunium(VI) to neptunium(IV), respectively, and to do so without reducing the uranium, and also a nitrous acid scavenger suitable for destroying the nitrous acid that tends to form in the aqueous phase, and thus to stabilize the reducing agent and the Pu(III). This reducing agent is, for example, uranous nitrate (or U(IV)), whereas the nitrous acid scavenger is, for example, hydrazine (or NH);

an operation, labelled "Pu barrage", which consists in completing the back-extraction of the plutonium(IV) by bringing the solvent phase resulting from the "Pu/U back-extraction" into contact with an aqueous nitric phase of low acidity, for example a 0.05 to 2M nitric acid solution, containing the same reducing agent and the same nitrous acid scavenger as those used for the "Pu/U back-extraction"; and an operation, labelled "U back-extraction" which consists in back-extracting the uranium(VI) from the solvent phase resulting from the "Pu barrage", by bringing this solvent phase into contact with a very dilute aqueous nitric phase, for example a 0 to 0.05M nitric acid solution.

Since neptunium(Iv) is less extractable by TBP than neptunium(VI), it is partially back-extracted during the "Pu/U back-extraction". The aqueous phase resulting from this operation therefore contains neptunium in addition to plutonium and uranium.

The partition step therefore also includes an operation, labelled "Np scrubbing", which consists in back-extracting the neptunium(IV) present in the aqueous phase resulting from the "Pu/U back-extraction", by bringing this phase into contact with a solvent phase consisting of about 30% (v/v) TBP in a dodecane, in order to remove from this aqueous phase the neptunium fraction that it contains.

Moreover, since uranium(VI) and neptunium(IV) behave in a relatively similar manner, a fraction of the uranium(VI) present in the aqueous phase resulting from the "U/Pu back-extraction" is re-extracted with the neptunium, which fraction may be relatively large depending on the parameters used to carry out the "Np scrubbing".

Thus, and as may be seen in FIG. 1, it is possible, according to the invention, to add uranium to the aqueous phase subjected to the "Np scrubbing", just before said phase leaves the unit where this operation takes place, in order to recharge this aqueous phase with uranium should this be deemed necessary. This uranium, which may without distinction be uranium(VI) or uranium(IV), may be added in the form of an aqueous nitric solution, it being understood that, if it is uranium(IV), the latter is then stabilized by a nitrous acid scavenger of the hydrazine type.

The aqueous phase resulting from the "Np scrubbing" is then subjected to an oxidation operation for bringing the Pu(III) back to oxidation state (IV) and, where appropriate, the U(IV) to oxidation state (VI), before the step of purifying the plutonium and the uranium that it contains is carried out.

This oxidation operation may especially be carried out in a conventional manner, that is to say by making said aqueous phase flow, after possibly being diluted with an aqueous nitric phase of high acidity, for example a 12M nitric acid solution, in a stream of nitrogen oxides $NO_X$ so as to destroy the nitrous acid scavenger that it contains, thereby making it possible for the nitrous acid to reform and reoxidize the Pu(III) to Pu(IV), the excess nitrous acid then being removed by decomposition to NO and $NO_2$ and venting of the nitrogen oxides thus formed.

The step of purifying the plutonium and the uranium which follows the partition step and is for the purpose of completing the decontamination of these two elements from the fission products, i.e. so as to obtain in practice an aqueous plutonium-uranium stream preferably having a content of fission products of at most 1 µCi per gram of plutonium, comprises:

an operation, labelled "Pu/U coextraction", which consists in jointly extracting the plutonium(IV) and the uranium (VI) from the aqueous phase resulting from the oxidation operation, by bringing this phase into contact with a solvent phase consisting of about 30% (v/v) TBP in a dodecane, as previously;

an operation, labelled "FP scrubbing", which consists in removing from the solvent phase resulting from the "Pu/U coextraction" the fission products that have been extracted during this coextraction, by bringing this solvent phase into contact with an aqueous nitric phase of moderate acidity, for example a 1 to 3M nitric acid solution; and an operation, labelled "U/Pu back-extraction", which consists in back-extracting from the solvent phase resulting from the "FP scrubbing" the plutonium(IV) and a fraction of the uranium(VI) that are present in this phase, by bringing the latter into contact with an aqueous nitric phase of low acidity, for example a 0.05 to 2M nitric acid solution, containing a reducing agent capable of reducing the Pu(IV) to Pu(III), without touching the uranium, for example, hydroxylammonium nitrate (or HAN), stabilized by a nitrous acid scavenger of the hydrazine type.

As may be seen in FIG. 1, it is possible, here again, to add uranium to the aqueous phase subjected to the "U/Pu back-extraction" just before the aqueous phase leaves the unit where this operation takes place, in order to recharge this aqueous phase with uranium should this be deemed necessary. As previously, the uranium thus added may be uranium (VI) or uranium(IV) as an aqueous nitric solution containing, in addition, a nitrous acid scavenger if the uranium is uranium (IV).

The raffinate resulting from the "Pu/U coextraction" is removed from the process.

The solvent phase resulting from the "Pu/U back-extraction", which contains uranium but no longer contains plutonium, rejoins the solvent phase resulting from the "Np scrubbing".

The aqueous phase resulting from the "Pu/U back-extraction", which is laden with purified plutonium(III) and uranium(IV) or (VI) is itself sent to a unit where, after an oxidation operation for reoxidizing the Pu(III) to Pu(IV) and which is preferably carried out in the same way as the oxidation operation following the "Np scrubbing", it is subjected to the concentration step in order to increase its plutonium content and its uranium content.

The aqueous phase thus concentrated is then stored, for example in tanks with a system of tubes, for a period advantageously corresponding to several months of implementation of the reprocessing process, for example 4 to 6 months, so as to have a stock of purified plutonium and uranium sufficient so that the workshops responsible for manufacturing MOX nuclear fuel are able to work independently of the workshops responsible for reprocessing the spent fuel. This storage also makes it possible to adjust the isotopy of the plutonium to that required for the workshops for manufacturing MOX nuclear fuel.

After the storage, the process of the invention further includes:

an operation to reduce the plutonium(IV) present in the concentrated aqueous phase to Pu(III) by the addition of an aqueous nitric solution containing U(IV) stabilized by a nitrous acid scavenger; and an operation, labelled "U scrubbing", which consists in removing from the concentrated aqueous phase the uranium(VI) that it contains by bringing this aqueous phase into contact with a solvent phase, again consisting of approximately 30% (v/v) TBP in a dodecane.

The solvent phase resulting from the "U scrubbing" rejoins the solvent phase resulting from the "Pu/U back-extraction" of the purification step and, with it, the solvent phase resulting from the "Np scrubbing".

The aqueous phase resulting from the "U scrubbing" is itself directed to a unit where, after a possible adjustment of its U(IV) content suitable for in this phase a U(Pu) mass ratio consistent with that which the mixed uranium-plutonium oxide that it is desired to prepare must have, the step of coconverting the plutonium and uranium to a mixed oxide is carried out.

As previously mentioned, this coconversion step is preferably carried out according to the process described in FR-A-2 870 841, that is to say by coprecipitation, by oxalic acid or one of its salts or one of its derivatives, of uranium(IV) and plutonium(III) that had been prestabilized by a singly charged cation consisting only of atoms chosen from oxygen, carbon, nitrogen and hydrogen atoms, such as the hydrazinium cation, or by a compound such as a salt, capable of forming such a cation, followed by calcination of the resulting coprecipitate, preferably in an inert or very slightly oxidizing gas, for example a gas containing predominantly argon.

The mixed uranium-plutonium oxide powder thus obtained can then be used to manufacture MOX nuclear fuel pellets, for example by a MIMAS process, in which case this powder is screened, mixed with uranium oxide and possibly with scrap from the manufacture of pellets in the form of chamotte, and then the resulting mixture undergoes a pelletizing operation followed by a sintering operation.

As indicated above, it is preferred to use, for the manufacture of MOX nuclear fuels, a mixed oxide powder having a U/Pu mass ratio of approximately 50/50.

Consequently, the amount of uranium that is introduced into the unit where the "Np scrubbing" takes place is preferably such that the aqueous phase resulting from this operation has a U/Pu mass ratio of around 20/80 to 50/50, and the parameters used to carry out the "Pu/U back-extraction" located downstream of this "Np scrubbing" are preferably adjusted so as to obtain, after this back-extraction, an aqueous phase having a U/Pu mass ratio of around 20/80 to 50/50 and, ideally, of around 20/80 to 30/70. It is desirable to obtain such a ratio in order to minimize the volume of material stored in tanks.

In any case, by adjusting the U(IV) content of the aqueous phase resulting from the "U scrubbing" it is possible, should it be necessary, to give the aqueous phase subjected to the co-conversion operation a U/Pu ratio equal or approximately equal to 50/50.

In the embodiment mode of the process of the invention illustrated in FIG. 1, this includes, in addition, operations of purifying the uranium present in the aqueous phase resulting from the "U back-extraction", which operations are intended to complete its decontamination from the fission products and most particularly to separate it from the neptunium fraction that had followed it during the "Pu/U back-extraction" and the "U back-extraction" of the partition step. These purification operations may be carried out as in any conventional PUREX process and have consequently not been shown in FIG. 1 for the sake of simplifying this figure, nor have they been shown in the following figures.

The process of the invention may also include ancillary operations, in particular operations of scrubbing, with pure diluent, the aqueous phases intended to be sent to the vitrification unit and operations of scrubbing and regenerating the spent solvent phases. Here again, these operations, which are well known in the prior art, have not been shown in FIGS. 1 to 5 for the sake of simplifying these figures.

Figure 2:
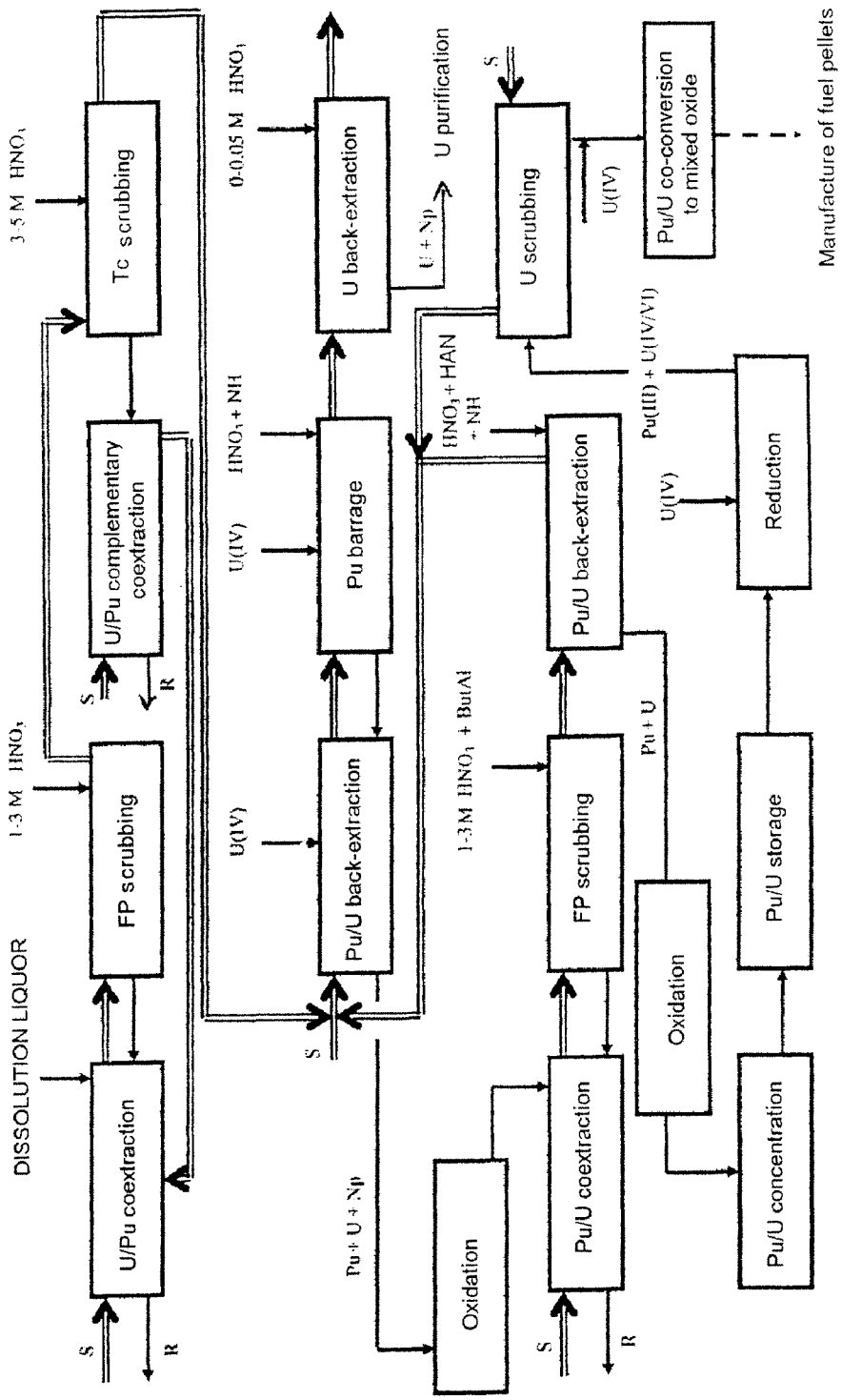
FIG. 2 shows a block diagram of a first variant of the embodiment mode illustrated in FIG. 1.

A block diagram of a first variant of the embodiment mode illustrated in FIG. 1 will now be described with reference to FIG. 2, in which:
the partition step does not include "Np scrubbing"; and
the neptunium present in the aqueous phase resulting from the "Pu/U back-extraction" of this step is removed during the purification step.

To do this, after a "Pu/U coextraction" operation similar to that of the embodiment mode described above, the "FP scrubbing" of the purification step is carried out by bringing the solvent phase resulting from this coextraction into contact with an aqueous phase of moderate acidity, for example a 1 to 3M aqueous nitric acid solution, to which has been added a reducing agent capable of reducing neptunium(VI) which is extractable by TBP, to neptunium(V), which is not extractable by TBP, and to do so without reducing either the plutonium or the uranium. This reducing agent is, for example, a butyraldehyde (ButAl).

The neptunium thus passes into the aqueous phase, whereas the plutonium and the uranium remain in the solvent phase.

The "Pu/U back-extraction" is then carried out in the mode of implementation described above, but by suitably adjusting the parameters of this operation so as to obtain a U/Pu mass ratio of around 20/80 to 50/50 and, ideally, of around 20/80 to 30/70 in the aqueous phase, bearing in mind that the U/Pu mass ratio of the solvent phase resulting from the "FP scrubbing" is likely to be almost the reverse because of the absence of "Np scrubbing".

Figure 3:
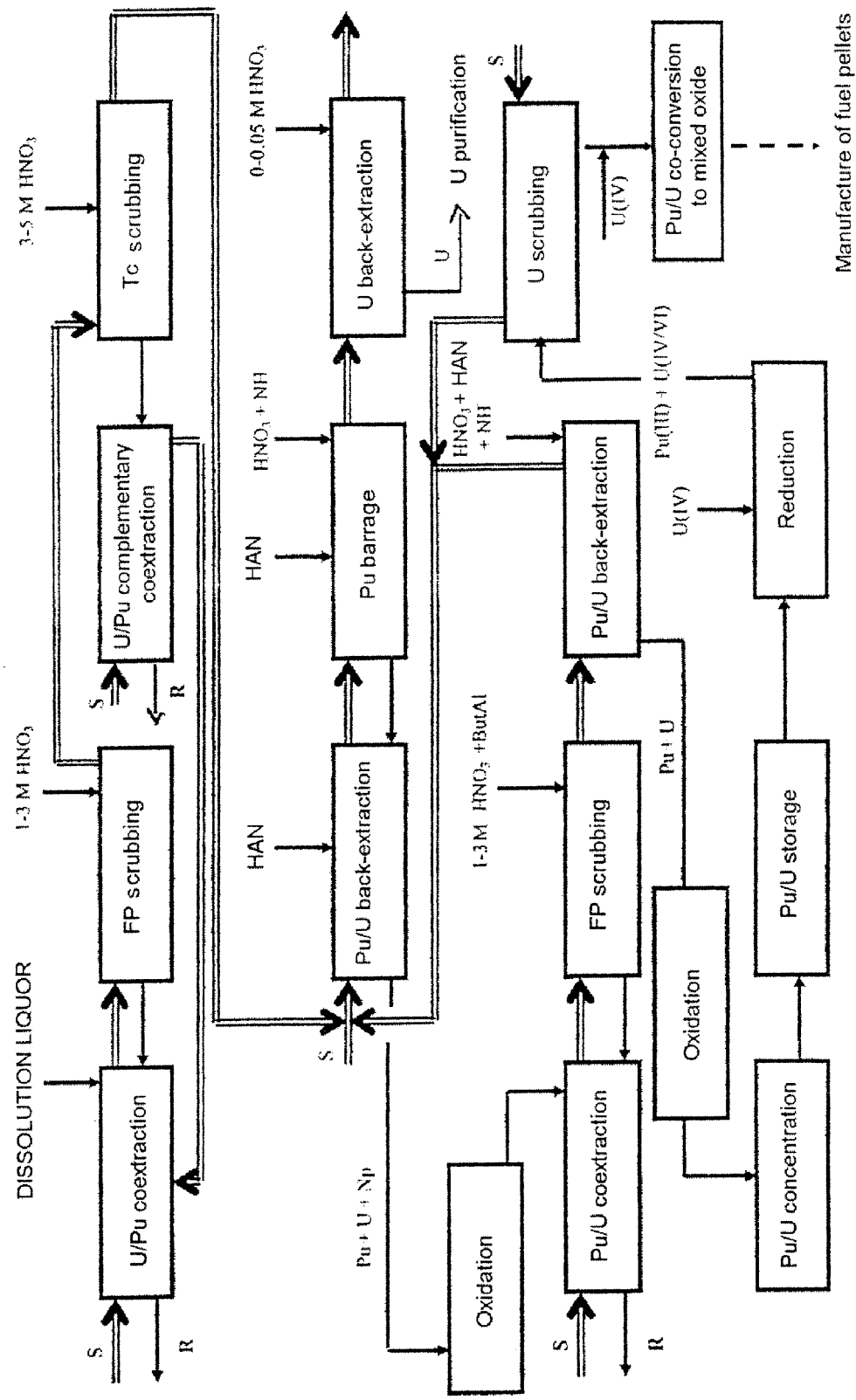
FIG. 3 shows a block diagram of a second variant of the embodiment mode illustrated in FIG. 1.

FIG. 3 shows a block diagram of a second variant of the embodiment mode illustrated in FIG. 1.

This second variant differs from the variant that has just been described in that the reducing agent present in the aqueous phase used during the "Pu/U back-extraction" and "Pu barrage" operations of the partition step is an agent that is capable of reducing plutonium(IV) to plutonium(III) and neptunium(VI) to neptunium(V), respectively, this being the case, for example, of hydroxylammonium nitrate.

Since neptunium(V) is not extractable by TBP, it is therefore completely back-extracted during the "Pu/U back-extraction" and the "Pu barrage" and what are obtained after the partition step are two aqueous phases, one of which, resulting from the "Pu/U back-extraction" contains plutonium, uranium, and neptunium, whereas the other, resulting from the "U back-extraction" contains uranium but does not contain either plutonium or neptunium.

The removal of the neptunium present in the aqueous phase resulting from the "U/Pu back-extraction" of the partition step is then carried out during the "FP scrubbing" of the purification step, in exactly the same way as in the first variant.

This variant makes it possible, in the case of reprocessing spent nuclear fuels that have cooled for about 10 years or more, to dispense with the operations intended to purify the uranium.

Figure 4:
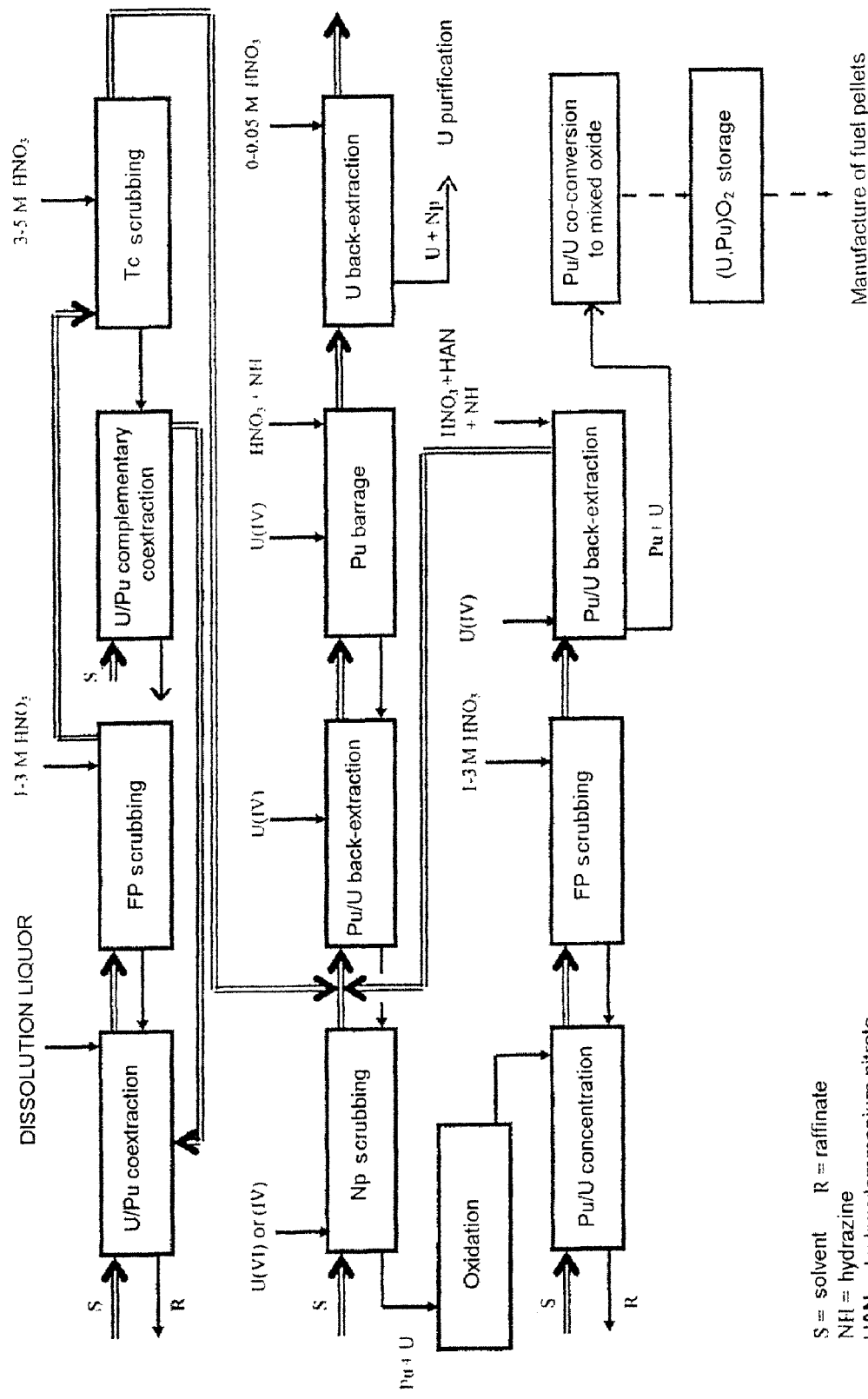
FIG. 4 shows a block diagram of a third variant of the embodiment mode illustrated in FIG. 1.

FIG. 4 shows schematically yet another variant of the embodiment mode of the process of the invention illustrated in FIG. 1, which differs from this embodiment mode in that the aqueous phase resulting from the "Pu/U back-extraction" of the purification step is sent directly to a unit where the step of coconverting the plutonium and uranium to a mixed oxide is carried out.

In this variant, the "Pu/U back-extraction" operation of the purification step therefore necessarily includes the addition of a suitable amount of uranium(IV) so as to give the aqueous phase resulting from this operation a U/Pu mass ratio consistent with that which the mixed uranium-plutonium oxide that it is desired to manufacture must have.

Moreover, the decoupling between the workshops responsible for manufacturing MOX nuclear fuel and the workshops responsible for reprocessing spent nuclear fuel is ensured by storing the mixed uranium-plutonium oxide powder obtained after the coconversion step.

Figure 5:
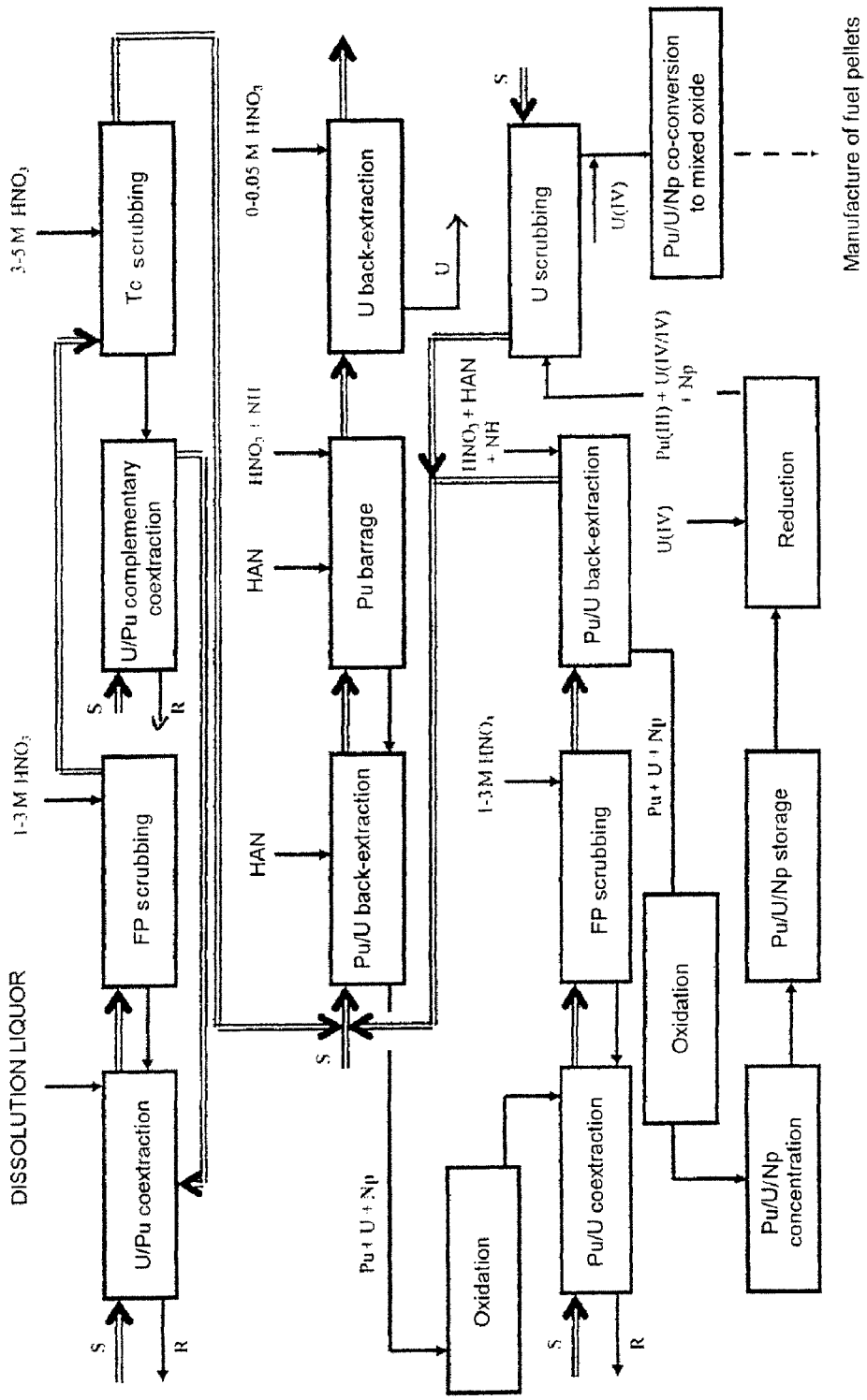
FIG. 5 shows a block diagram of a second embodiment mode of the process according to the invention.

FIG. 5 illustrates schematically a second embodiment mode of the process of the invention which, unlike the previous ones, is designed to obtain a mixed uranium-plutonium oxide powder, which also contains neptunium, from a dissolution liquor of a spent $UO_2$ nuclear fuel.

In this embodiment mode, the process takes place as in the mode of implementation illustrated in FIG. 3 except that it does not include the elimination of the neptunium during the "FP scrubbing" of the purification step.

The neptunium therefore accompanies the plutonium with which it was back-extracted during the "Pu/U back-extraction" throughout all the subsequent steps of the process until a mixed uranium-plutonium-neptunium oxide is obtained.

To give an example, a simulation was carried out using the PAREX Code of the Commissariat à L'Energie Atomique for the first embodiment mode of the process of the invention illustrated in FIG. 1.

The data of this simulation were the following:
Dissolution liquor:
[U]=250 g/L
[Pu]=2.55 g/L
4.5M $HNO_3$
Feed flow rate in the process=637 L/h;
Solvent phases:
30% (v/v) TBP in TPH;
Step of separating the uranium and plutonium from the fission products, americium and curium:
Solvent phase entering the "U/Pu coextraction" unit: flow rate=1272 L/h
Aqueous phase entering the "FP scrubbing" unit: 2M $HNO_3$, flow rate=273 L/h
Aqueous phase entering the "Tc scrubbing" unit: 1.5M $HNO_3$, flow rate=38 L/h; then 12M $HNO_3$, flow rate=200 L/h Solvent phase entering the "U/Pu complementary coextraction" unit: flow rate=545 L/h;

Partition step, separating uranium and plutonium into two aqueous phases:

Aqueous phase entering the "Pu barrage" unit: 0.2M $HNO_3$+0.15M hydrazine, flow rate=236 L/h; then 0.2M $HNO_3$+150 g/L U(IV), flow rate=9.4 L/h Addition of U(IV) to the "Pu/U back-extraction" unit: 150 g/L, flow rate=21.7 L/h Solvent phase entering the "Np scrubbing" unit: flow rate=215 L/h Aqueous phase leaving the "Np scrubbing" unit:
[Pu]=6 g/L
[U]=1.83 g/L
Flow rate=272.5 L/h;

Oxidation operation:

Aqueous phase used to dilute the aqueous phase resulting from the "Np scrubbing": 12M $HNO_3$, flow rate=110 L/h Aqueous phase resulting from the oxidation operation:
[Pu]=4.2 g/L
[U]=1.3 g/L
Flow rate=385.4 L/h;

Plutonium/uranium purification step:

Solvent phase entering the "Pu/U coextraction" unit: flow rate=95 L/h

Aqueous phase entering the "FP scrubbing" unit: 1.5M $HNO_3$, flow rate=24 L/h; then 12M $HNO_3$, flow rate=6 L/h Aqueous phase entering the "Pu/U back-extraction" unit: 0.2M $HNO_3$+0.2M hydrazine+0.4M hydroxylammonium nitrate, flow rate=47 L/h Addition of U(IV) to the "Pu/U back-extraction" unit: 150 g/L, flow rate=11 L/h Aqueous phase leaving the "Pu/U back-extraction" unit:
[Pu]=27.5 g/L
[U]=6.7 g/L
Flow rate=59.1 L/h;

Concentration step:

Aqueous phase resulting from the concentration operation:
[Pu]=200 g/L
[U]=50 g/L;

Reduction operation:

Addition of U(IV) to the reduction unit: 200 g/L, flow rate=8.1 L/h

Aqueous phase resulting from the reduction operation:
[Pu]=100 g/L
[U]=125 g/L; and Adjustment operation Aqueous phase adjustment: $HNO_3$+200 g/L U(IV).

What is thus obtained is an aqueous phase containing 50 g/L of Pu, in oxidation state (III), and 50 g/L of U, in oxidation state (IV), which have a purity level of greater than 99% and are suitable for being coconverted to a mixed uranium-plutonium oxide.

CITED REFERENCES

US-A-4 278 559
FR-A-2 870 841
Article BN 3650 (07-2000): The treatise "Génie Nucléaire"—"Techniques de l'Ingénieur".

The invention claimed is:

1. A process for reprocessing a spent nuclear fuel comprising uranium, plutonium, fission products, americium and curium and for, preparing a mixed uranium-plutonium oxide, comprising at least:

a) separating the uranium and plutonium from the fission products, the americium and the curium that are present in a aqueous nitric acid solution that results from dissolving the spent nuclear fuel in nitric acid, a) comprising coextracting uranium in oxidation state (VI), and plutonium in oxidation state (IV), from the aqueous nitric acid solution by bringing the solution into contact with a water-immiscible solvent phase comprising at least one extractant in an organic diluent;

b) partitioning the uranium and plutonium coextracted in a) into two aqueous phases, a first aqueous phase comprising plutonium and uranium, and a second aqueous phase comprising uranium but not containing plutonium;

c) purifying the plutonium and uranium present in the first aqueous phase obtained after b) from the fission products also found in the first aqueous phase; and d) coconverting the plutonium and uranium that are present in the aqueous phase obtained after c) into a mixed uranium-plutonium oxide.

2. The process according to claim 1, wherein a) further comprises scrubbing the solvent phase obtained after the coextraction of uranium-plutonium by bringing the solvent phase into contact with an aqueous nitric acid phase.

3. The process according to claim 1, wherein:

b) comprises at least:

$b_1$) back-extracting the plutonium in oxidation state (III), and a fraction of the uranium in oxidation state (VI), from the solvent phase obtained after a), by bringing the solvent phase into contact with an aqueous phase comprising nitric acid and a reducing agent capable of reducing plutonium(IV) to plutonium(III) without reducing the uranium; and $b_2$) back-extracting the uranium that has not been back-extracted from the solvent phase during $b_1$), by bringing the solvent phase into contact with an aqueous phase comprising nitric acid; and c) comprises at least:

$c_1$) coextracting the plutonium in oxidation state (IV), and the uranium in oxidation state (VI), from the aqueous phase obtained after step $b_1$), by bringing the aqueous phase into contact with a water-immiscible solvent phase containing comprising at least one extractant in an organic diluent;

$c_2$) scrubbing the solvent phase obtained after $c_1$) by bringing the solvent phase into contact with an aqueous phase comprising nitric acid; and $c_3$) back-extracting the plutonium in oxidation state (III), and a fraction of the uranium in oxidation state (VI) from the solvent phase obtained after $c_2$), by bringing the solvent phase into contact with an aqueous phase comprising nitric acid and a reducing agent capable of reducing plutonium(IV) to plutonium(III) without reducing the uranium(VI).

4. The process according to claim 3, further comprising, between b) and c), oxidizing the plutonium(III) present in the aqueous phase obtained after $b_1$) to plutonium(IV).

5. The process according to claim 3, wherein, neptunium being present in the aqueous phase obtained after $b_1$) is removed either during b) or during c).

6. The process according to claim 5, wherein, in order to remove the neptunium, b) further comprises $b_3$) consisting in re-extracting the neptunium in oxidation state (IV) from the aqueous phase obtained after $b_1$), by bringing the aqueous phase into contact with a water-immiscible solvent phase comprising at least one extractant in an organic diluent.

7. The process according to claim 6, wherein $b_3$) further comprises adding uranium to the aqueous phase subjected to $b_3$).

8. The process according to claim 6, wherein $c_3$) further comprises adding uranium to the aqueous phase subjected to $c_3$).

9. The process according to claim 7, wherein the added uranium is uranium(VI) or uranium(IV).

10. The process according to claim 8, wherein the added uranium is uranium(VI) or uranium(IV).

11. The process according to claim 5, wherein, in order to remove the neptunium, the aqueous phase used during $c_2$) comprises a reducing agent capable of reducing neptunium (VI) to neptunium(V) without reducing the plutonium(IV) or the uranium(VI).

12. The process according to claim 3, wherein neptunium being present in the aqueous phase obtained after $b_1$), is left to follow the plutonium present in the aqueous phase up to d).

13. The process according to claim 5, wherein d) comprises:
stabilizing the plutonium in oxidation state (III), the uranium in oxidation state (IV), and optionally the neptunium in oxidation state (IV), by a singly-charged cation consisting of atoms selected from the group consisting of oxygen, carbon, nitrogen and hydrogen atoms;
coprecipitating the thus stabilized plutonium, uranium and optionally neptunium by oxalic acid or a salt or a derivative thereof; and then
calcinating the coprecipitate thus obtained.

14. The process according to claim 12, wherein d) comprises:
stabilizing the plutonium in oxidation state (III), the uranium in oxidation state (IV), and optionally the neptunium in oxidation state (IV), by a singly-charged cation consisting of atoms selected from the group consisting oxygen, carbon, nitrogen and hydrogen atoms;
coprecipitating the stabilized plutonium, uranium and optionally neptunium by oxalic acid or a salt or a derivative thereof; and then
calcinating the coprecipitate thus obtained.

15. The process according to claim 5, further comprising, between c) and d), storing the aqueous phase obtained after $c_3$).

16. The process according to claim 12, further comprising, between c) and d), storing the aqueous phase obtained after $c_3$).

17. The process according to claim 14, further comprising, between c) and d), storing the aqueous phase obtained after $c_3$).

18. The process according to claim 17, further comprising:
between c) and the storing the aqueous phase, oxidizing the plutonium(III) present in the aqueous phase obtained after $c_3$) to plutonium(IV), followed by concentrating the aqueous phase; and
between the storing the aqueous phase and d), reducing the plutonium(IV), the uranium(VI) and optionally the neptunium(VI), which are present in the concentrated aqueous phase that has been stored, to plutonium(III), to uranium(IV) and to neptunium(IV).

19. The process according to claim 17, further comprising:
between c) and the storing the aqueous phase, oxidizing the plutonium(III) present in the aqueous phase obtained after $c_3$) to plutonium(IV), followed by concentrating the aqueous phase; and
between the storing the aqueous phase and d), reducing the plutonium(IV), and optionally the neptunium(VI), which are present in the concentrated aqueous phase that has been stored, to plutonium(III), followed by extracting the uranium(VI) by bringing the concentrated aqueous phase into contact with a water-immiscible solvent phase comprising at least one extractant in an organic diluent.

20. The process according to claim 13, wherein the mixed uranium-plutonium oxide obtained after d) contains no neptunium.

21. The process according to claim 20, wherein the mixed uranium-plutonium oxide has a U/Pu mass ratio of 50/50.

22. The process according to claim 14, wherein the mixed uranium-plutonium oxide obtained after d) comprises neptunium.

23. The process according to claim 22, wherein the mixed uranium-plutonium oxide has a U/Pu/Np mass ratio of 49/49/2.

24. The process according to claim 1, wherein the extractant is a trialkyl phosphate.

25. The process according to claim 3, wherein the extractant is a trialkyl phosphate.

26. The process according to claim 6, wherein the extractant is a trialkyl phosphate.

27. The process according to claim 15, wherein the extractant is a trialkyl phosphate.

28. The process according to claim 1, wherein the organic diluent is a dodecane.

29. The process according to claim 3, wherein the organic diluent is a dodecane.

30. The process according to claim 6, wherein the organic diluent is a dodecane.

31. The process according to claim 15, wherein the organic diluent is a dodecane.

32. The process according to claim 1, wherein the solvent phase comprises tri-n-butyl phosphate in a dodecane, in a volume ratio of around 30/70.

33. The process according to claim 3, wherein the solvent phase comprises tri-n-butyl phosphate in a dodecane, in a volume ratio of around 30/70.

34. The process according to claim 6, wherein the solvent phase comprises tri-n-butyl phosphate in a dodecane, in a volume ratio of around 30/70.

35. The process according to claim 15, wherein the solvent phase comprises tri-n-butyl phosphate in a dodecane, in a volume ratio of around 30/70.

36. The process according to claim 3, wherein the reducing agent capable of reducing plutonium(IV) to plutonium(III) without reducing the uranium is uranous nitrate or hydroxyammonium nitrate.

37. The process according to claim 36, wherein the reducing agent is used in conjunction with a nitrous acid scavenger.

38. The process according to claim 11, wherein the reducing agent capable of reducing neptunium(VI) to neptunium (V) without reducing either the plutonium(IV) or the uranium (VI) is a compound of the butyraldehyde family or hydrazine.

39. The process according to claim 32, wherein a) comprises:
carrying out a first scrubbing operation on the solvent phase obtained after coextracting the uranium and plutonium, by bringing the solvent phase into contact with an aqueous phase comprising 1 to 3 mol/L of nitric acid;
carrying out a second scrubbing operation on the solvent phase, by bringing the solvent phase into contact with an aqueous phase comprising 3 to 5 mol/L of nitric acid; and complementarily coextracting uranium and plutonium from the aqueous phase obtained after the second scrubbing operation, by bringing this the aqueous phase into contact with a solvent phase comprising 30% (v/v) tri-n-butyl phosphate in a dodecane.

40. The process according to claim 33, wherein a) comprises:
carrying out a first scrubbing operation on the solvent phase obtained after coextracting the uranium and plutonium, by bringing the solvent phase into contact with an aqueous phase comprising 1 to 3 mol/L of nitric acid;
carrying out a second scrubbing operation on the solvent phase, by bringing the solvent phase into contact with an aqueous phase comprising 3 to 5 mol/L of nitric acid; and
complementarily coextracting uranium and plutonium from the aqueous phase obtained after the second scrubbing operation, by bringing the aqueous phase into contact with a solvent phase comprising 30% (v/v) tri-n-butyl phosphate in a dodecane.

41. The process according to claim 34, wherein a) comprises:
carrying out a first scrubbing operation on the solvent phase obtained after coextracting the uranium and plutonium, by bringing the solvent phase into contact with an aqueous phase comprising 1 to 3 mol/L of nitric acid;
carrying out a second scrubbing operation on the solvent phase, by bringing the solvent phase into contact with an aqueous phase comprising 3 ti 5 mol/L of nitric acid; and
complementarily coextracting uranium and plutonium from the aqueous phase obtained after the second scrubbing operation, by bringing the aqueous phase into contact with a solvent phase comprising 30% (v/v) tri-n-butyl phosphate in a dodecane.

42. The process according to claim 35, wherein a) comprises:
carrying out a first scrubbing operation on the solvent phase obtained after coextracting the uranium and plutonium, by bringing the solvent phase into contact with an aqueous phase comprising 1 to 3 mol/L of nitric acid;
carrying out a second scrubbing operation on the solvent phase, by bringing the solvent phase into contact with an aqueous phase comprising 3 to 5 mol/L of nitric acid; and
complementarily coextracting uranium and plutonium from the aqueous phase obtained after the second scrubbing operation, by bringing the aqueous phase into contact with a solvent phase comprising 30% (v/v) tri-n-butyl phosphate in a dodecane.

43. The process according to claim 33, wherein
the aqueous phases used during $b_1$) and $c_3$) comprise 0.05 to 2 mol/L of nitric acid;
the aqueous phase used during $b_2$) comprises 0 to 0.05 mol/L of nitric acid; and
the aqueous nitric phase used during $c_2$) comprises 1 to 3 mol/L of nitric acid.

44. The process according to claim 1, further comprising purifying the uranium present in the second aqueous phase obtained after b).

45. The process according to claim 1, wherein the spent nuclear fuel is a uranium oxide fuel or a mixed uranium-plutonium oxide fuel.

46. The process according to claim 37, wherein the nitric acid scavenger is hydrazine.

* * * * *